3,671,219
RIPENING OF SUGARCANE BY USE OF CERTAIN QUATERNARY AMMONIUM HALIDES
Louis G. Nickell, Honolulu, Hawaii, assignor to Hawaiian Sugar Planters' Association, Honolulu, Hawaii
No Drawing. Filed July 20, 1970, Ser. No. 56,735
Int. Cl. A01n 9/20
U.S. Cl. 71—121                 11 Claims

ABSTRACT OF THE DISCLOSURE

Sucrose yield of sugarcane is increased by treating sugarcane a few weeks prior to harvest with a quaternary ammonium salt which is a benzyl dimethyl alkyl or substituted alkyl ammonium halide, wherein the alkyl or substituted alkyl group contains between 1 and 20 carbon atoms. Representative compounds are benzyldimethyltetradecylammonium chloride and benzyltrimethylammonium chloride.

BACKGROUND OF THE INVENTION

Considerable progress has been made in the last several years in increasing the sugar yield of sugarcane by improving the varieties being planted, enriching the soil with fertilizers and irrigating the soil in climates which do not naturally provide sufficient moisture. More recent efforts in improving sugar production have increasingly turned toward the use of chemicals in modifying and controlling the physiological processes of sugarcane, particularly in ripening prior to harvest. See U.S. Pats. Nos. 3,224,865; 3,245,775; 3,291,592; 3,482,958; 3,482,959, 3,482,961; and 3,493,361.

Extensive efforts consequently continue to be made in seeking chemical compounds which have a high degree of effectiveness in increasing the sucrose yield of sugarcane but which readily break down in the plant and in the soil after they have performed their intended function. Ease of degradation is particularly desirable when such compounds are used in connection with the production of sugar intended for nutritive use, though it may not be important when the sugar is used as a chemical raw material, e.g., in fermentation processes.

Generally speaking, chemicals selected for evaluation have been of types which have been previously found active in work with other plants as plant hormones, herbicides or inhibitors of growth of terminal buds, or active in killing the spindle of cane upon topical microapplication, etc. However, among the compounds heretofore found to be useful for such other special purposes, very few have been found effective in controlling the ripening of sugarcane in the desirable manner. No predictable relationship has been recognized to date between the chemical structure of such compounds and (a) their phytotoxic effects, (b) their physiological effects on the morphogenetic development of the plant, and (c) their activity in having positive effects on ripening. Consequently, the search for suitable agents continues to be fundamentally empirical.

A review of the literature discloses that some work has been done using surfactants to increase the crystallization rate of cane sugar and in the purification of sugar juices. See Ramaiah et al., Proceedings, 29th Annual Conventional of the Sugar Tech. Assoc. of India, 1961, Part II. The compounds used in the process of the present invention are well known surfactants and quarternary ammonium germicides. Studies on the toxicity of the quarternary ammonium germicides are few, but Finnegan et al., "Toxicity of Quaternaries," Soap and Sanitary Chemicals, volume 30, No. 2, page 147, 1954, indicate that there is no hazard to humans when as much as 200 p.p.m. of diisobutylphenoxyethoxyethyldimethylbenzyl-ammonium chloride ("Hyamine 1622") and alkyl ($C_9$–$C_{15}$) tolylmethyltrimethylammonium chloride ("Hyamine 2389") are used in dishwashing. Alkyldimethylbenzylammonium chloride ("Hyamine 3500") has been fully cleared by the Food and Drug Administration for use as a sanitizer for food processing equipment and utensils (Federal Code of Regulations 121.2547 as amended in The Federal Register for May 27, 1969). According to a manufacturer of the compounds that are effective in the invention, survival data from a two-year feeding experiment on rats indicate that the mortality is not affected by the addition of the quarternary ammonium salts until a dietary level of 2500 p.p.m. is exceeded.

"Hyamine 1622," "Hyamine 2389," and "Hyamine 3500" have been registered by the United States Department of Agriculture, and their respective registration numbers are 707–15, 707–49 and 707–63.

It is an object of this invention to provide new agents for controlling the ripening of sugarcane. A more specific object is to increase the sucrose yield of sugarcane by chemically treating it during its final ripening stages prior to harvest without introducing substantial toxicological hazards, and preferably by causing as little damage to the cane plant as possible.

Still more specifically, it is an object to increase the sucrose yield of sugarcane by treating it prior to harvest with a chemical agent which is sufficiently stable to provide the desired effect over a period of time (preferably several weeks) and thus give adequate operational flexability, but which has a relatively low degree of persistence and is susceptible to autocomposition or decomposition by soil bacterial. Compounds which increase the sucrose content of sugarcane only temporarily after application and then result in a substantial decrease are generally not desirable for the intended purpose.

SUMMARY OF INVENTION

It has now been discovered that excellent results in increasing the sucrose yield of sugarcane can be obtained by treating the younger, growing parts of the cane stalk a few weeks before harvest with an effective amount of a quarternary ammonium compound wherein two of the four radicals attached to the amine nitrogen are methyl groups. One of the radicals is an alkyl substituted or unsubstituted benzyl radical, and the fourth may be a lower alkyl ($C_1$–$C_4$) radical, a higher alkyl radical or a substituted alkyl radical such as diisobutylphenoxyethoxyethyl, wherein the phenoxy group may be additionally substituted by lower alkyl. The anion of the quarternary ammonium salt may be a halogen, such as a bromine or chlorine atom. The preferred usage form in this invention is a mixture containing the quarternary amine salt in an aqueous solution or suspension utilizing one or a combination of nonionic surface active agents. Quaternary amines which are suitable for use in the present invention can be represented by the formula

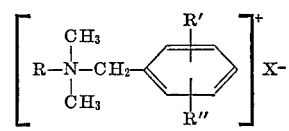

wherein R is alkyl from 1 to 20 carbon atoms or phenoxyethoxyethyl wherein the phenoxy group is substituted by at least one alkyl group, R' is hydrogen or lower alkyl, R" is hydrogen or alkyl from 8 to 20 carbon atoms and X is chlorine or bromine. This includes specific compounds such as:

octyldimethylbenzylammonium chloride,
dodecyldimethylbenzylammonium chloride,
dodecyldimethylbenzylammonium bromide,
tetradecyldimethylbenzylammonium chloride,
tetradecyldimethylbenzylammonium bromide,
cetyldimethylbenzylammonium chloride,
eicosyldimethylbenzylammonium chloride,
(diisobutylphenoxyethoxy)ethyldimethylbenzylammonium chloride,
(isobutylphenoxyethoxy)ethyldimethylbenzylammonium bromide,
(diisobutylcresoxyethoxy)ethyldimethylbenzylammonium chloride,
(dodecylphenoxyethoxy)ethyldimethylbenzylammonium bromide,
(methyldodecyl)benzyltrimethylammonium chloride,
(ethyloctyl)benzyltrimethylammonium chloride,
(lauryl)benzyltrimethylammonium chloride, and so forth. Generally, the preferred agents contain at least one alkyl group of at least eight carbon atoms, either attached directly to the central nitrogen atom or as a substituent on the benzyl or on the phenoxy radical.

In accordance with this invention, the sugarcane crop is treated with one or more of the quaternary ammonium salts heretofore indicated, or with a composition containing one or more of such compounds, at any time from 2 to 10 weeks before harvest, the preferred time for treatment being between 3 and 8 weeks prior to harvest.

Good results are obtained when the sugarcane crop is treated at a rate in the range of from about 1 to about 4 pounds of the kind of quaternary amine salt referred to above per acre of sugarcane, through higher rates of up to about 10 pounds or more per acre as well as rates lower than 1 pound per acre can be used. The optimum amount will vary somewhat depending on the specific treating composition applied, environmental conditions, time of year, age of cane and in some cases the specific variety of cane being treated, but can be readily determined for each particular case by preliminary testing.

The active agent is conveniently applied in the field in the form of an aqueous solution or suspension, e.g., a liquid composition which may be sprayed from a boom-spray or a solid dust composition where the active compound is diluted in an inert solid such as clay or which can be applied as a dust from an airplane. In preparing suitable liquid compositions, surface active agents of the type described for instance in U.S. Pat. 3,224,865, column 2, lines 61–66 or in U.S. Pat. 3,245,775, column 2, lines 57–64 are convenient to use. The preferred surfactants for use in liquid compositions of the present invention are those of the nonionic type e.g., alkyl phenoxy poly (ethylene-oxy) ethanols such as adducts of nonylphenol and ethylene oxide; trimethyl nonyl polyethylene glycol ethers; polyethylene oxide adducts of fatty and resin acids; and long chain alkyl mercaptan adducts with ethylene oxide.

With the type of boom-spray apparatus used in this work, it has been found convenient to apply the active quaternary amine compound to the sugarcane field in the form of aqueous solutions, suspensions or emulsions having a concentration of active agent such that the application at the rate of from about 7 to 20 gallons of liquid composition per acre will provide the required dosage of active chemical. However, the use of lower or higher gallonages may be preferred when a different dispensing mechanism is used.

The preferred carrier for the active quaternary ammonium salt is water to which about 0.1 to 2% by weight of a surface active agent has been added. However, instead of using water as the carrier, non-phytotoxic mineral oils either as such or in the form of water-in-oil or oil-in-water emulsions may be used similarly in accordance with practices which are common in the art of treating vegetation with beneficial growth control agents.

DESCRIPTION OF SPECIFIC EMBODIMENTS

Examples 1.0 g. of a 50% aqueous mixture of n-alkyldimethylbenzylammonium chlorides is dissolved in 4 ml. water that contains as a surfactant about 0.25% (w./w.) nonylphenol which was ethoxylated to contain about 10.5 mols of ethylene oxide per mol of nonylphenol ("Tergitol NPX"). The quaternary salt mixture contained about 40% of dodecyldimethylbenzylammonium chloride, about 50% tetradecyldimethylbenzylammonium chloride and about 10% cetyldimethylbenzylammonium chloride. This particular AlkylDimethylBenzylAmmonium Chloride mixture is referred to as "ADBAC." 0.6 ml. of the aqueous ADBAC solution is deposited or dropped by means of a syringe with a fine needle on the spindle area at the top or last visible dewlap of each of 20 stalks of sugarcane aged 20.2 months. (A dewlap is the junction between the blade of the leaf and the sheath which clasps the stalk.) Ten of these stalks were harvested 4 weeks after such treatment and 10 more were harvested 5 weeks after such treatment.

An equal number of stalks were treated in an identical manner with a similar solution prepared from an aqueous mixture of quaternary salts composed of 80% (methyldodecyl)benzyltrimethylammonium chloride and 20% methyldodecylxylylene bis-(trimethylammonium chloride (DBTAC).

In still another test each stalk was treated as above with 0.3 ml. of an aqueous solution containing 11% by weight of (diisobutylphenoxyethoxy)ethyldimethylbenzylammonium chloride (PDBAC).

The top 15 joints of the treated cane as well as those of similar untreated cane are removed, combined and analyzed in terms of juice purity and pol percent cane, following the so-called "press method" developed by T. Tanimoto, Hawaiian Planters Record, 57, 133 (1964). "Pol percent cane" is a polarimetric determination and equals the percentage of sucrose if the latter is the only substance in the solution which will rotate the plane of polarized light. In any event, determination of the pol percent cane is a standard and effective method for determining the sucrose content of sugarcane. The results are given in Table I below:

TABLE I

| | Harvest (weeks after application) | | | | | |
| --- | --- | --- | --- | --- | --- | --- |
| | (4) | | | (5) | | |
| | Pol percent juice | Juice purity | Pol percent cane | Pol percent juice | Juice purity | Pol percent cane |
| Control (untreated) | 12.10 | 80.99 | 10.62 | 12.96 | 83.17 | 11.36 |
| ADBAC | 14.16 | 85.66 | 12.37 | 13.58 | 82.96 | 12.00 |
| DBTAC | 12.69 | 82.40 | 11.10 | 15.23 | 84.94 | 13.48 |
| PDBAC | 16.32 | 89.23 | 14.08 | 15.28 | 85.94 | 13.20 |

Similar tests were conducted with PDBAC, but varying the amount applied per stalk. The results are shown in Table II.

TABLE II

| Amount applied | Harvest (weeks after application) | | | | | |
|---|---|---|---|---|---|---|
| | (4) | | | (5) | | |
| | Pol percent juice | Juice purity | Pol percent cane | Pol percent juice | Juice purity | Pol percent cane |
| Control | 12.60 | 82.23 | 11.01 | 10.93 | 78.41 | 9.48 |
| 0.30 ml | 15.18 | 86.99 | 13.08 | 13.74 | 86.58 | 12.02 |
| 0.60 ml | 15.57 | 87.18 | 13.57 | 15.89 | 87.55 | 13.92 |

As is apparent, the application of the compounds of the invention resulted in a substantial improvement in both juice purity and pol percent cane, relatively independently of the degree of ripeness which the cane has naturally reached at the time of the chemical treatment.

The nature, scope, utility and effectiveness of the present invention have been described and specifically exemplified in the foregoing specification. However, it should be understood that these examples are not intended to be limiting and that the true scope of the invention to be protected is particularly pointed out in the appended claims.

What is claimed is:

1. A process for increasing the sugar yield of sugarcane which comprises applying to the cane at a time at least about two weeks and up to about nine weeks prior to harvest an effective amount of a quaternary amine salt corresponding to the formula:

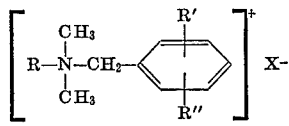

wherein R is alkyl of from 1 to 20 carbon atoms or diisobutylphenoxyethoxyethyl wherein the phenoxy group may be substituted by lower alkyl groups, R' is hydrogen or lower alkyl, R'' is hydrogen or alkyl of from 8 to 20 carbon atoms and X is chlorine or bromine.

2. A process according to claim 1 wherein the salt corresponds to the formula:

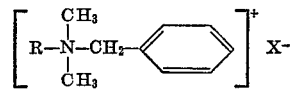

wherein R is alkyl of from 8 to 20 carbon atoms and X is chlorine or bromine.

3. A process according to claim 2 wherein R is alkyl of from 12 to 16 carbon atoms and X is chlorine.

4. A process according to claim 1 wherein the salt corresponds to the formula:

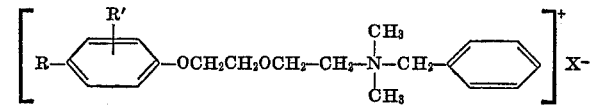

wherein R is alkyl of from 4 to 12 carbon atoms, $R^1$ is hydrogen or lower alkyl and X is chlorine or bromine.

5. A process according to claim 4 wherein R is diisobutyl, $R^1$ is hydrogen and X is chlorine.

6. A process according to claim 1 wherein the salt corresponds to the formula:

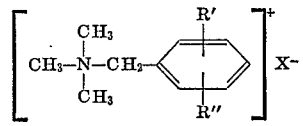

wherein R' is hydrogen or lower alkyl, R'' is alkyl of from 8 to 20 carbon atoms and X is chlorine or bromine.

7. A process according to claim 6 wherein R' is methyl, R'' is dodecyl and X is chlorine.

8. A process according to claim 1 wherein the salt is applied to the cane in admixture with water as a carrier.

9. A process according to claim 1 wherein the salt is applied to the cane in the form of an aqueous solution or suspension at the rate of about 5 to 10 gallons of aqueous composition per acre.

10. A process according to claim 9 wherein the aqueous composition contains between 0.1 and 2% by weight of an additional surface active agent.

11. A process according to claim 9 wherein the aqueous composition contains between 0.1 and 2% by weight of a nonionic surface active agent.

References Cited
UNITED STATES PATENTS 3,574,851  4/1971  Hyatt _____ 71—121 X
3,482,961  12/1969  Nickell et al. _____ 71—121

OTHER REFERENCES

Nickell et al.: "Sugarcone Ripening With Chemicals," Hawaiian Sugar Tech. Reports, vol. 26 (1967), pp. 104–109.

LEWIS GOTTS, Primary Examiner

C. L. MILLS, Assistant Examiner